Patented Sept. 10, 1940

2,214,337

UNITED STATES PATENT OFFICE 2,214,337

MANUFACTURE OF DISAZO DYES

Georg Matthaeus, Wolfen, Kreis Bitterfeld, Germany, assignor to General Aniline & Film Corporation, a corporation of Delaware No Drawing. Application September 13, 1938, Serial No. 229,704. In Germany October 7, 1937

4 Claims. (Cl. 260—178)

According to this invention valuable greenish-blue to black disazo dyes are obtained by combining a tetrazotized diaminodiphenylamine or a derivative thereof in an alkaline solution with one molecular proportion of a 1-amino-8-hydroxynaphthalene-mono-sulfonic acid or a 1-amino-8-hydroxynaphthalene-disulfonic acid substituted by alkyl in the amino group and with one molecular proportion of a hydroxy compound of the benzene series capable of being coupled, for instance, 1.3-dihydroxybenzene or 3-hydroxydiphenylamine. The dyes are above all suitable for the dyeing of leather.

The following examples illustrate the invention, the parts being by weight:

*Example 1.*—19.9 parts of 4.4'-diaminodiphenylamine are tetrazotized and combined with 31.9 parts of an alkaline solution of 1-ethylamino-8-hydroxynaphthalene-3.6-disulfonic acid. As soon as the formation of the monoazo dye is complete, an alkaline solution of 18.5 parts of 3-hydroxy-diphenylamine is added thereto. The disazo dye obtained is salted out; it yields on leather dark blue to black somewhat greenish tints of good properties of fastness.

Instead of the ethyl-substituted 1-amino-8-hydroxynaphthalene there may also be used, for instance, with good success the propyl-substituted 1-amino-8-hydroxynaphthalene or the butyl-substituted 1-amino-8-hydroxynaphthalene sulfonic acids.

*Example 2.*—By replacing the final component of Example 1 by 11 parts of 1.3-dihydroxybenzene, a dye is obtained which dyes leather deep green-black tints without bronzing.

*Example 3.*—19.9 parts of 4.4'-diaminodiphenylamine are tetrazotized and combined with 37.5 parts of an alkaline solution of 1-butylamino-8-hydroxynaphthalene-3.6-disulfonic acid. When the monoazo dye has formed, an alkaline solution of 18.5 parts of 3-hydroxydiphenylamine is added. The disazo dye obtained is salted out; after drying it is a grey-black powder and dyes leather beautiful dark blue greenish tints of good properties of fastness.

*Example 4.*—By substituting in Example 3 11 parts of resorcinol for the 3-hydroxydiphenylamine, a dye is obtained which dyes leather deep greenish black tints.

The 1-butylamino-8-hydroxynaphthalene-3.6-disulfonic acid used in the examples may be obtained by an alkaline condensation of 1-amino-8-hydroxynaphthalene-3.6-disulfonic acid with n-butyl chloride in an alkaline medium.

*Example 5.*—19.9 parts of 4.4'-diaminodiphenylamine are combined in the form of a tetrazo compound with 43.1 parts of an alkaline solution of 1-benzylamino-8-hydroxy-naphthalene-3.6-disulfonic acid. When the coupling is finished an alkaline solution of 11 parts of 1.3-dihydroxybenzene is added to the solution. A disazo dye is obtained which dyes leather greenish black tints.

What I claim is:

1. The azo dyes which correspond to the general formula

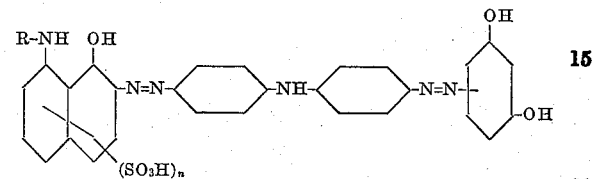

wherein R is an alkyl radicle, $n$ is one of the indices 1 and 2, said dyes dyeing leather greenish black tints of good fastness.

2. The azo dyes which correspond to the general formula

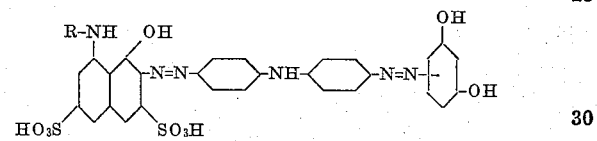

wherein R is an alkyl radicle, said dyes dyeing leather greenish black tints of good fastness.

3. The process which comprises bisdiazotizing a 4.4'-diaminodiphenylamine and coupling the bisdiazo compound in an alkaline solution with an aminohydroxynaphthalene sulfonic acid of the general formula

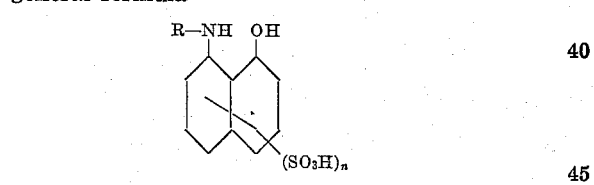

wherein R means an alkyl radicle and $n$ is one of the indices 1 and 2, and with 1.3-dihydroxybenzene.

4. The process which comprises bisdiazotizing a 4.4'-diaminodiphenylamine and coupling the bisdiazo compound in an alkaline solution with 1-hydroxy-8-alkylaminonaphthalene-3.6-disulfonic acid and with 1.3 dihydroxybenzene.

GEORG MATTHAEUS.